United States Patent
Do et al.

(10) Patent No.: US 8,456,717 B2
(45) Date of Patent: Jun. 4, 2013

(54) METHOD OF PRESSURE DETECTION FOR SELECTIVE SCANNING OF A DOCUMENT

(75) Inventors: Lydia M. Do, Research Triangle Park, NC (US); Lisa M. Seacat, San Francisco, CA (US); Pamela A. Nesbitt, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 1186 days.

(21) Appl. No.: 12/178,294

(22) Filed: Jul. 23, 2008

(65) Prior Publication Data

US 2010/0020365 A1 Jan. 28, 2010

(51) Int. Cl.
*H04N 1/04* (2006.01)
*H04N 1/387* (2006.01)
*G06K 9/22* (2006.01)

(52) U.S. Cl.
USPC .......... 358/497; 358/474; 358/453; 382/312; 382/315; 382/282

(58) Field of Classification Search
USPC ................. 358/497, 494, 474, 453; 382/314, 382/315, 312
See application file for complete search history.

(56) References Cited

U.S. PATENT DOCUMENTS

| | | | | |
|---|---|---|---|---|
| 4,829,341 A | * | 5/1989 | Sasaki et al. | 355/75 |
| 4,965,678 A | * | 10/1990 | Yamada | 358/452 |
| 5,194,729 A | * | 3/1993 | Okisu et al. | 250/222.1 |
| 6,646,765 B1 | | 11/2003 | Barker et al. | |
| 6,753,981 B1 | | 6/2004 | Park | |
| 6,970,607 B2 | | 11/2005 | Jia et al. | |
| 2005/0231767 A1 | * | 10/2005 | Brake et al. | 358/474 |
| 2006/0209363 A1 | | 9/2006 | Suenaga et al. | |

FOREIGN PATENT DOCUMENTS

| | | | | |
|---|---|---|---|---|
| JP | 62066280 A | * | 3/1987 | |
| JP | 62122459 A | * | 6/1987 | |
| JP | 62266964 A | * | 11/1987 | |
| JP | 63182770 A | * | 7/1988 | |

* cited by examiner

*Primary Examiner* — Cheukfan Lee
(74) *Attorney, Agent, or Firm* — Suiter Swantz pc llo

(57) ABSTRACT

A method of scanning comprises detecting a document on a scanning device scanning surface, wherein the document lies directly on the scanning device scanning surface; detecting pressure on the scanning device scanning surface to scan a region of the document; detecting a first point pressure of a first point and a second point pressure of a second point; connecting the first point and the second point, the connecting the first point and the second point forming a boundary between a first document region and a second document region; and receiving a scan instruction to scan at least one of the first region of the document and the second region of the document.

14 Claims, 2 Drawing Sheets

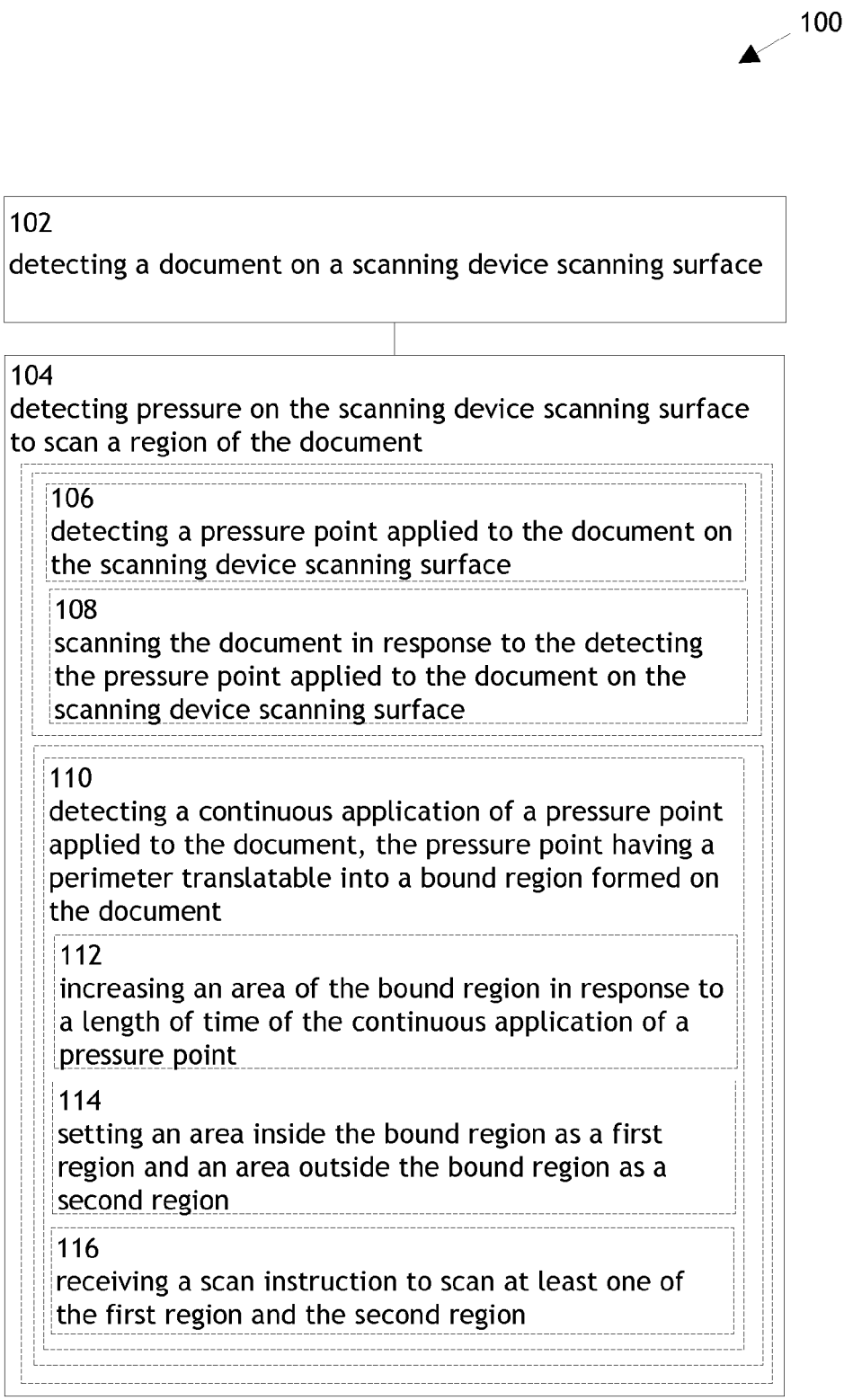

102
detecting a document on a scanning device scanning surface

104
detecting pressure on the scanning device scanning surface to scan a region of the document

106
detecting a pressure point applied to the document on the scanning device scanning surface

108
scanning the document in response to the detecting the pressure point applied to the document on the scanning device scanning surface

110
detecting a continuous application of a pressure point applied to the document, the pressure point having a perimeter translatable into a bound region formed on the document

112
increasing an area of the bound region in response to a length of time of the continuous application of a pressure point

114
setting an area inside the bound region as a first region and an area outside the bound region as a second region

116
receiving a scan instruction to scan at least one of the first region and the second region

102
detecting a document on a scanning device scanning surface

104
detecting pressure on the scanning device scanning surface to scan a region of the document

118
detecting a first point pressure of a first point and a second point pressure of a second point

120
connecting the first point and the second point, the connecting the first point and the second point forming a boundary between a first document region and a second document region

122
receiving a scan instruction to scan at least one of the first region of the document and the second region of the document

124
detecting at least a first point pressure of a first point, a second point pressure of a second point and a third point pressure of a third point

126
connecting at least the first point, the second point and the third point to form an enclosed boundary

128
setting an area inside the enclosed boundary as a first region and an area outside the enclosed boundary as a second region

130
receiving a scan instruction to scan at least one of the first region and the second region

FIG. 1B

METHOD OF PRESSURE DETECTION FOR SELECTIVE SCANNING OF A DOCUMENT

TECHNICAL FIELD

The present disclosure generally relates to the field of computing, and more particularly to scanning and cropping of a document or photograph.

BACKGROUND

Document scanning and cropping are useful for providing document clean-up, digital image creation, and electronic document retrieval.

SUMMARY

The present application provides a method of scanning including, but not limited to: detecting a document on a scanning device scanning surface; and detecting pressure on the scanning device scanning surface to scan a region of the document, further including at least one of: (a) detecting a pressure point applied to the document on the scanning device scanning surface; and scanning the document in response to the detecting the pressure point applied to the document on the scanning device scanning surface; (b) detecting a continuous application of a pressure point applied to the document, the pressure point having a perimeter translatable into a bound region formed on the document, further including: increasing an area of the bound region in response to a length of time of the continuous application of a pressure point; setting an area inside the bound region as a first region and an area outside the bound region as a second region; and receiving a scan instruction to scan at least one of the first region and the second region; (c) detecting a first point pressure of a first point and a second point pressure of a second point; connecting the first point and the second point, the connecting the first point and the second point forming a boundary between a first document region and a second document region; and receiving a scan instruction to scan at least one of the first region of the document and the second region of the document; and (d) detecting at least a first point pressure of a first point, a second point pressure of a second point and a third point pressure of a third point; connecting at least the first point, the second point and the third point to form an enclosed boundary; setting an area inside the enclosed boundary as a first region and an area outside the enclosed boundary as a second region; and receiving a scan instruction to scan at least one of the first region and the second region.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which:

FIG. 1A is a flow diagram illustrating a method for selective scanning of a document; and FIG. 1B is a flow diagram illustrating a method for selective scanning of a document.

DETAILED DESCRIPTION

Reference will now be made in detail to the subject matter disclosed, which is illustrated in the accompanying drawings.

Referring to FIGS. 1A and 1B, flow diagrams representing a method 100 for scanning a document are shown. The method 100 includes detecting a document on a scanning device scanning surface 102. In one embodiment, method 100 may determine a desired portion of the detected document (e.g., a photo, a text document) to be retained or excluded during the scanning process. For example, a portion of a 4×6 picture, when placed on a scanning device, may be scanned, the selected portion or portions of the picture may be retained for display, manipulation, printing, etc., and the non-selected portion may be excluded.

The method may further include detecting pressure on the scanning device scanning surface to scan a region of the document 104. For instance, the method 100 may detect an application of pressure and scan an entire document. Detecting an application of pressure on the scanning device scanning surface to scan a region of the document 104 may further include detecting a pressure point applied to the document on the scanning device scanning surface 106, and scanning the document in response to the detecting the pressure point applied to the document on the scanning device scanning surface 108. A time interval may be programmed, and the method 100 may include receiving an instruction to scan the document upon detection of pressure for the programmed time interval. Method 100 may detect an application of pressure applied for the programmed time interval (e.g., 1 second, 5 seconds, etc.), and scan the document.

The method 100 may also provide scanning of a region or portion of a document based on the detection of an applied pressure to the surface of the document before or during the scanning process. For instance, the method 100 may include detecting a continuous application of a pressure point applied to the document, the pressure point having a perimeter translatable into a bound region formed on the document 110. Detecting a continuous application of a pressure point applied to the document may further include increasing an area of the bound region in response to a length of time of the continuous application of a pressure point 112. Method 100 may further include setting an area inside the bound region as a first region and an area outside the bound region as a second region 114, and receiving a scan instruction to scan at least one of the first region and the second region 116. For example, pressure may be applied to a specific point on the document, and the method 100 may exclude from the scan all portions of the document outside of a radius of the single pressure point (e.g., a first region), or scan all portions of the document within the radius of the single pressure point (e.g., a second region). Continuous application of pressure may be within a range of 1-10 seconds of applied continuous pressure, or may be shorter or longer than this range. In further embodiments, method 100 may provide expansion of the bound region in response to detecting a series of taps in substantially the same location on the scanning surface. For instance, two taps may indicate enlarging the bound region by a factor of 2; three taps may indicate enlarging the bound region by a factor of 3, etc. However, it is contemplated that any number of taps may correspond to any size increment.

In other instances, the method 100 may utilize multiple point pressure detection to define an area of the document to be scanned or excluded. For instance, the method 100 may include detecting a first point pressure of a first point and a second point pressure of a second point 118, connecting the first point and the second point, the connecting the first point and the second point forming a boundary between a first document region and a second document region 120, and receiving a scan instruction to scan at least one of the first region of the document and the second region of the document 122. For instance, if only a top half of a document is desired to be scanned, pressure may be applied on or about the middle of a first longitudinal edge of the document and on or about the middle of a second longitudinal edge of the document substantially opposite from the first longitudinal edge. Method 100 may connect the first pressure point and the second pressure point to form a horizontal line dividing the document substantially in half. Method 100 may designate the top half of the document and a first region and the bottom half of the document as a second region. Method 100 may receive an instruction to scan the first region (the top half of the document). It is further contemplated that a non-enclosed boundary may also be formed from three or more connectable pressure points.

Method 100 may further include detecting at least a first point pressure of a first point, a second point pressure of a second point and a third point pressure of a third point 124, connecting at least the first point, the second point and the third point to form an enclosed boundary 126, setting an area inside the enclosed boundary as a first region and an area outside the enclosed boundary as a second region 128, and receiving a scan instruction to scan at least one of the first region or the second region 130. For instance, if only a triangular region within the document is desired to be scanned, pressure may be applied on or about three spatially distinct points within the document. Method 100 may connect the first pressure point, the second pressure point, and the third pressure point to form a triangle within the document. Method 100 may designate the interior region of the triangle a first region and the region of the document substantially outside the triangle as a second region. Method 100 may then receive an instruction to scan the first region (the triangle). It is further contemplated that a enclosed boundary may also be formed from four or more connectable pressure points.

Method 100 may detect pressure points applied simultaneously or consecutively. In the instances when pressure points are applied consecutively, method 100 may retain the pattern of applied pressure points until all pressure points have been applied.

In further embodiments, the method 100 may utilize shape pressure to define the area of the document to be retained or excluded. Specific shaped pressure (e.g., square, triangle, circle, abstract shape) may be applied to the back of the picture as the picture is scanned excluding the portion of the picture outside the shaped pressure area.

In all embodiments of the method 100, pressure may be applied directly to a document on a scanning surface of a scanning device, or to a protective overlay (e.g., a clear or opaque film) positioned over at least a portion of the document. To this end, the method 100 provides for the use of a transparent layer or film to protect the document surface from damage during the pressure application process. Pressure points applied to the surface of the document or scanner may be applied on the transparent layer or film may be detected through the transparent layer or film.

Method 100 may scan at least a portion of a non-excluded document area as detected by the application of one or more pressure points. Non-excluded document area may be processed further (e.g., saved, displayed, manipulated further, printed, and/or transferred) as desired. In some instances, method 100 may also include scanning the document in its entirety, and displaying only the non-excluded document portions. For instance, when at least one document exclusion area has been determined, method 100 may scan the entire document and display (e.g., on a display of a computing device) only the non-excluded document portions for further processing.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method of scanning comprising:
   detecting a document on a scanning device scanning surface, wherein the document lies directly on the scanning device scanning surface;
   detecting pressure on the scanning device scanning surface to scan a region of the document;
   detecting a first point pressure of a first point and a second point pressure of a second point;
   connecting the first point and the second point, the connecting the first point and the second point forming a boundary between a first document region and a second document region; and
   receiving a scan instruction to scan at least one of the first region of the document and the second region of the document.

2. The method of claim 1, wherein detecting pressure on the scanning device scanning surface to scan a region of the document further comprises:
   detecting pressure directly applied to the document on the scanning device scanning surface to scan a region of the document.

3. The method of claim 1, wherein detecting a first point pressure of a first point and a second point pressure of a second point further comprises:
   detecting simultaneously a first point pressure of a first point and a second point pressure of a second point.

4. The method of claim 1, wherein detecting a first point pressure of a first point and a second point pressure of a second point further comprises:
   detecting consecutively a first point pressure of a first point and a second point pressure of a second point.

5. The method of claim 4, further comprising:
   retaining a pattern of a plurality of consecutively applied pressure points until all consecutively applied pressure points of the plurality of consecutively applied pressure points have been applied.

6. A method of scanning comprising:
- detecting a document on a scanning device scanning surface, wherein the document lies directly on the scanning device scanning surface;
- detecting pressure on the scanning device scanning surface to scan a region of the document;
- detecting a continuous application of a pressure point applied to the document, the pressure point having a perimeter translatable into a bound region formed on the document;
- increasing an area of the bound region in response to a length of time of the continuous application of a pressure point;
- setting an area inside the bound region as a first region and an area outside the bound region as a second region; and
- receiving a scan instruction to scan at least one of the first region and the second region.

7. The method of claim 6, wherein detecting pressure on the scanning device scanning surface to scan a region of the document further comprises:
- detecting pressure directly applied to the document on the scanning device scanning surface to scan a region of the document.

8. The method of claim 6, further comprising:
- detecting a series of taps in substantially the same location on the scanning surface; and
- expanding the bound region in response to detecting the series of taps in substantially the same location on the scanning surface.

9. The method of claim 6, further comprising:
- detecting a series of taps in substantially the same location on the scanning surface;
- determining a quantity of taps of the series of taps in substantially the same location on the scanning surface; and
- expanding the bound region by a factor proportional to the quantity of taps in response to determining the quantity of taps of the series of taps in substantially the same location on the scanning surface.

10. The method of claim 9, wherein the series of taps comprises a series of at least two taps.

11. The method of claim 9, wherein the series of taps comprises a series of at least three taps.

12. The method of claim 6, wherein detecting a continuous application of a pressure point applied to the document, the pressure point having a perimeter translatable into a bound region formed on the document, further comprises:
- detecting a continuous application of a pressure point applied to the document for a duration of between one and ten seconds, the pressure point having a perimeter translatable into a bound region formed on the document.

13. A method of scanning comprising:
- detecting a document on a scanning device scanning surface, wherein the document lies directly on the scanning device scanning surface;
- detecting pressure on the scanning device scanning surface to scan a region of the document;
- detecting at least a first point pressure of a first point, a second point pressure of a second point, and a third point pressure of a third point;
- connecting at least the first point, the second point and the third point to form an enclosed boundary;
- setting an area inside the enclosed boundary as a first region and an area outside the enclosed boundary as a second region; and
- receiving a scan instruction to scan at least one of the first region and the second region.

14. The method of claim 13, wherein detecting pressure on the scanning device scanning surface to scan a region of the document further comprises:
- detecting pressure directly applied to the document on the scanning device scanning surface to scan a region of the document.

* * * * *